United States Patent [19]
Krude

[11] Patent Number: 5,716,278
[45] Date of Patent: Feb. 10, 1998

[54] CONSTANT VELOCITY UNIVERSAL JOINT FOR LARGE ARTICULATION ANGLES

[75] Inventor: Werner Krude, Neunkirchen, Germany

[73] Assignee: GKN Automotive AG, Lohmar, Germany

[21] Appl. No.: 568,123

[22] Filed: Dec. 6, 1995

[30] Foreign Application Priority Data

Dec. 6, 1994 [DE] Germany .................. 44 43 309.3

[51] Int. Cl.⁶ .................................................. F16D 3/22
[52] U.S. Cl. ........................ 464/139; 464/145; 464/906
[58] Field of Search ............................ 464/139, 141, 464/143, 147, 145, 906

[56] References Cited

U.S. PATENT DOCUMENTS

| | | | |
|---|---|---|---|
| 1,568,914 | 1/1926 | Owens | 464/141 |
| 1,763,206 | 6/1930 | Woveris | 464/141 |
| 2,238,647 | 4/1941 | Ivandick | |
| 3,338,070 | 8/1967 | Scott | 464/906 X |
| 4,249,395 | 2/1981 | Krude | 464/143 |
| 4,511,345 | 4/1985 | Winkler | 464/145 |

FOREIGN PATENT DOCUMENTS

| | | |
|---|---|---|
| 2388163 | 11/1978 | France . |
| 27 17 936 B2 | 5/1979 | Germany . |
| 32 06 436 C2 | 3/1984 | Germany . |
| 53-67046 | 6/1978 | Japan .................. 464/145 |
| 63-57922 | 12/1988 | Japan .................. 464/139 |

Primary Examiner—Daniel P. Stodola
Assistant Examiner—Eileen A. Dunn
Attorney, Agent, or Firm—Harness, Dickey & Pierce, P.L.C.

[57] ABSTRACT

A constant velocity universal joint for large articulation angles, consisting of an outer joint part comprising a cavity and longitudinally extending outer ball running grooves opening towards the cavity; an inner joint part positioned inside the cavity and comprising longitudinally extending inner ball running grooves corresponding to the outer ball running grooves; torque transmitting balls running in outer and inner ball running grooves associated with one another; and a cage which is arranged between the outer joint part and the inner joint part, which is provided with windows for accommodating the balls and which comprises two opposed apertures having generating central axes which extend transversely to the joint axis. With reference to the above joint it is proposed that the outer joint part is provided with radially opposed slots with surface-normal central axes which coincide with the central axes of the apertures, that at the inner joint part there are arranged two radially opposed journals which extend transversely to the joint axis and comprise central axes which coincide with the central axes of the slots and pass through the slots, that the cage is substantially annular in shape relative to the central axes of the apertures and that there is provided a two-arm joint yoke which, by means of its arms, is secured to the journals.

19 Claims, 16 Drawing Sheets

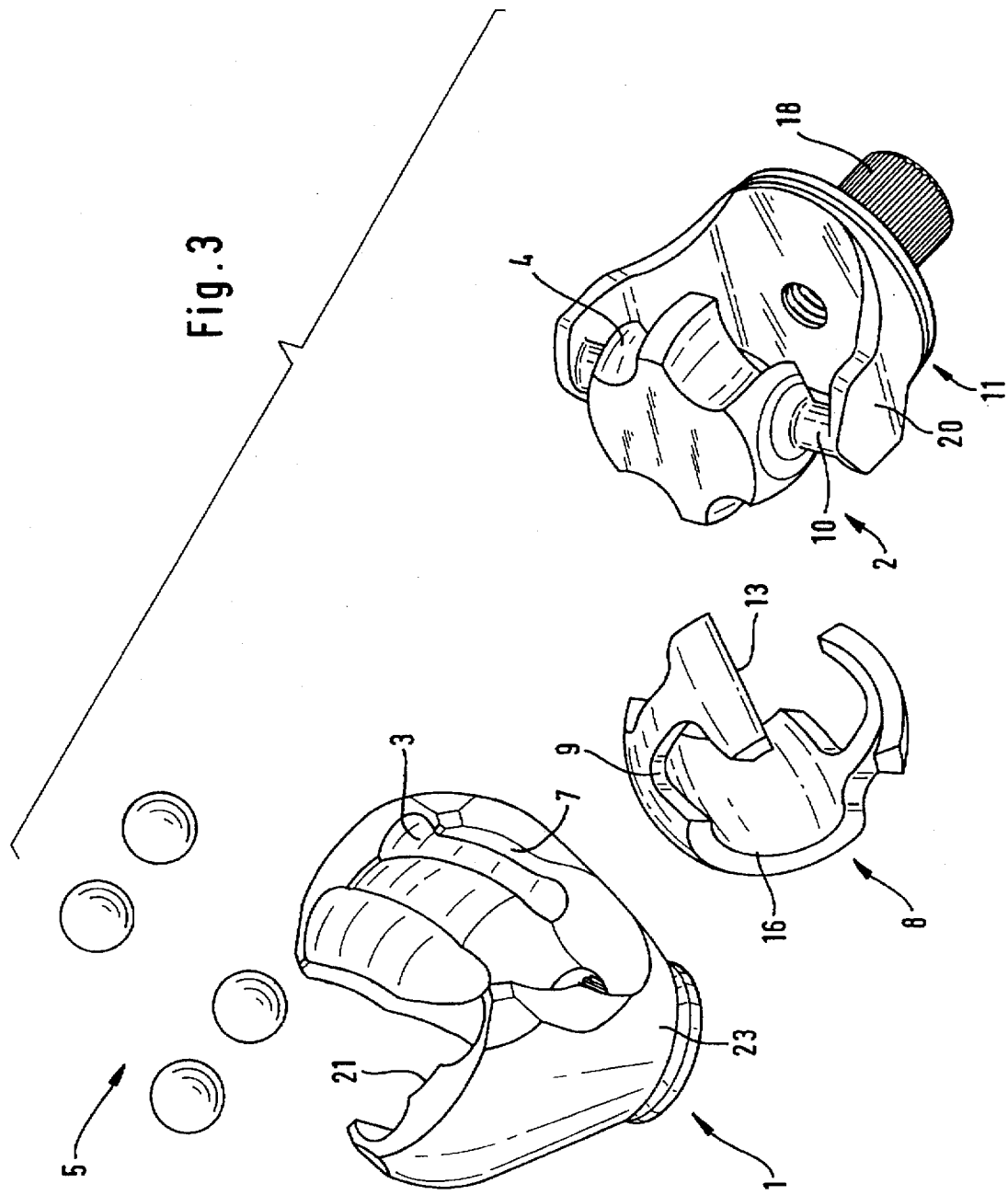

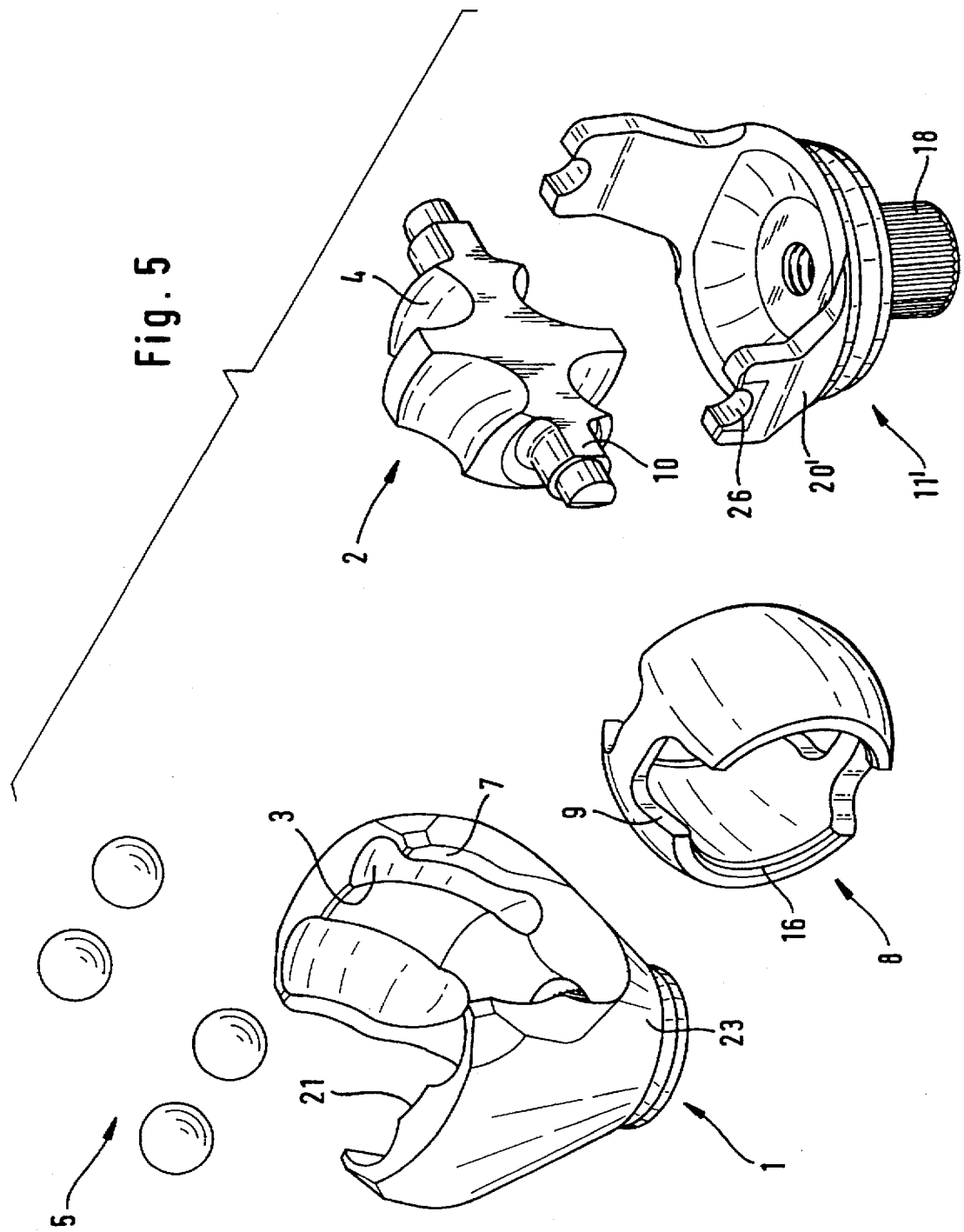

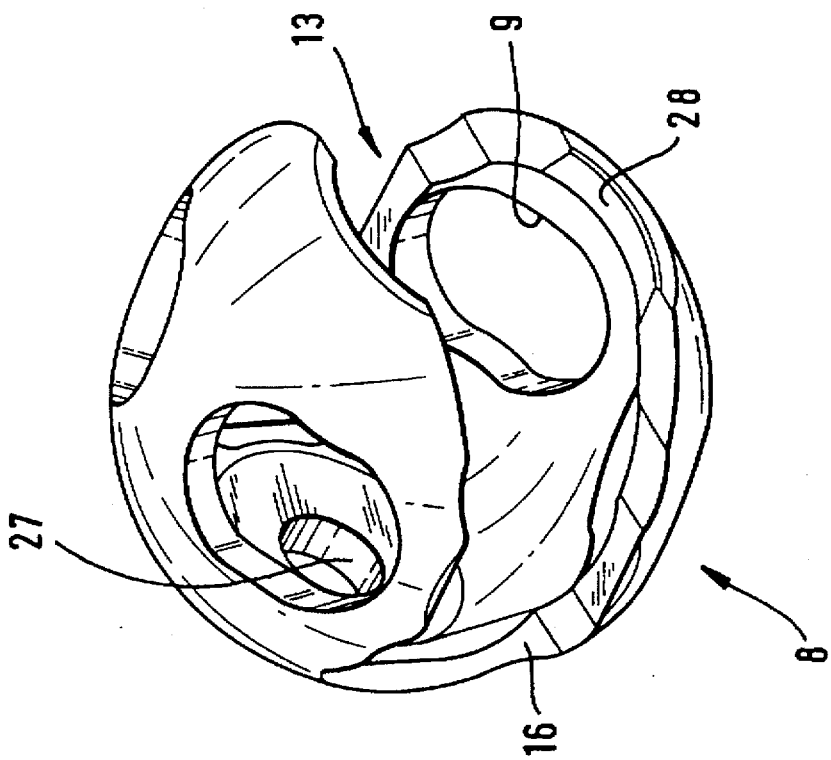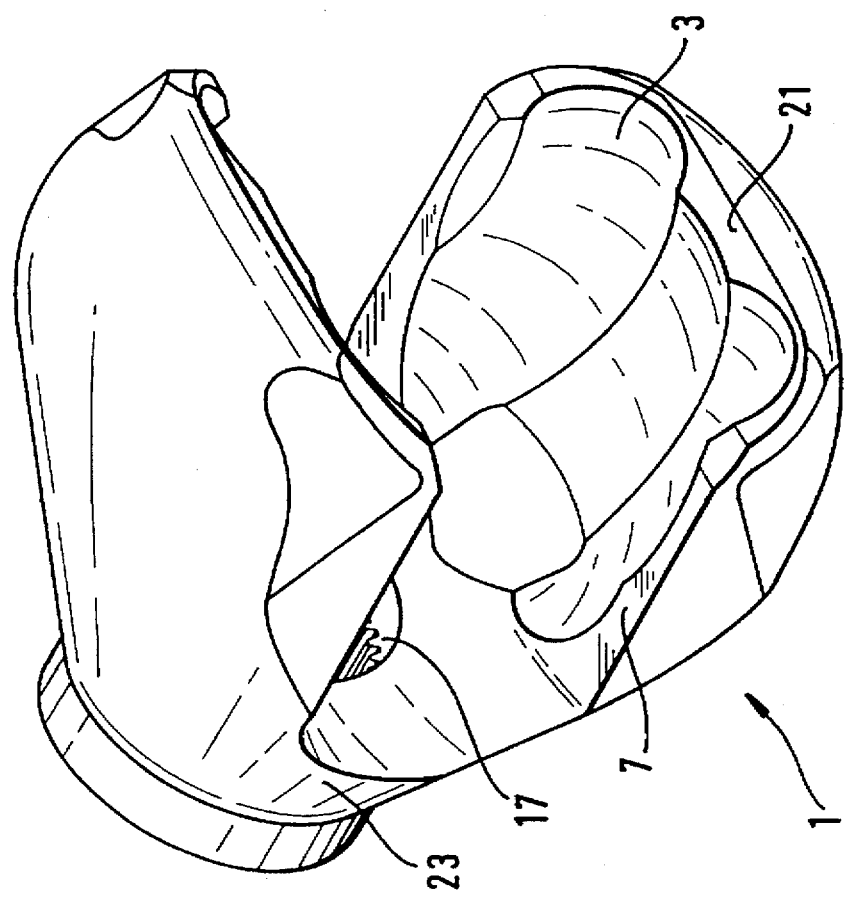
Fig. 13 under the 5,716,278

CONSTANT VELOCITY UNIVERSAL JOINT FOR LARGE ARTICULATION ANGLES

DESCRIPTION

Background of the Invention

The invention relates to a constant velocity universal joint for large articulation angles, consisting of an outer joint part comprising a cavity and longitudinally extending outer ball running grooves opening towards the cavity; an inner joint part positioned inside the cavity and comprising longitudinally extending inner ball running grooves corresponding to the outer ball running grooves; torque transmitting balls running in outer and inner ball running grooves associated with one another; and a cage which is arranged between the outer joint part and the inner joint part, which is provided with windows for accommodating the balls and which comprises two opposed apertures having generating central axes which extend transversely to the joint axis. Joints of this type are preferably used in steered driving axles of motor vehicles.

A joint of said type is known from DE AS 27 17 936 wherein there is used a cage which, at both ends, comprises apertures whose generating, surface-normal axes extend transversely to the joint axis. The windows of said cage are each open at one end towards said apertures. Parts of the inner joint part which form contact faces which are in direct sliding contact with the outer joint part extend through said apertures in the cage. The outer joint part comprises corresponding counter contact faces formed by the outer wall closed in a bell-like way. Such a shape of the outer joint part restricts the articulation angle of the joint.

DE 32 06 436 C2 describes a constant velocity universal joint wherein the balls are held in a plane extending perpendicularly relative to the axis of the inner joint part, with the inner joint part being provided with journals which extend radially relative to the axis and which are connected to a joint yoke. The joint permits large articulation angles up to 90°, but is behaviour is similar to that of a cardan joint, i.e. it does not have constant velocity characteristics because there are no means for guiding the balls on to the angle-bisecting plane between the inner joint part and outer joint part.

It is the object of the present invention to provide a constant velocity universal joint of the initially mentioned type which, at large articulation angles, should be capable of transmitting high torques.

The objective is achieved in that the outer joint part is provided with radially opposed slots with surface-normal central axes which coincide with the central axes of the apertures, that the inner joint part there are arranged two radially opposed journals which extend transversely to the joint axis and comprise central axes which coincide with the central axes of the slots and pass through the slots, that the cage is substantially annular in shape relative to the central axes of the apertures and that there is provided a two-arm joint yoke which, by means of its arms, is secured to the journals.

While having constant velocity characteristics ensured by guiding the balls held in the cage on to the angle-bisecting plane, the joint in accordance with the invention permits large articulation angles up to 60°. At the same time, the outer joint part and cage feature high strength values so that high torque values can be transmitted.

SUMMARY OF THE INVENTION

A first preferred embodiment consists in that the outer joint part comprises a central end aperture and that the slots are open towards the end aperture. Such a kind of joint embodiment is simple in design. The outer joint part can substantially be machined in the same way as the outer parts of conventional constant velocity universal joints. To achieve the largest possible articulation angle, it is proposed in particular that the outer joint part comprises a closed end part and that the slots extend from the end aperture to the closed end part.

A second alternative to the former preferred embodiment consists in that the outer joint part comprises a central end cover or bracket and that the slots are delimited at both ends in the outer joint part. This embodiment ensures that the strength of the outer joint part is particularly high, with any losses in strength being accommodated by the bracket or cover, without the outer joint part becoming very much heavier.

According to a further embodiment of the above-mentioned former design it is proposed that the outer ball running grooves are provided in a one-piece outer joint part. Again, said end part can be machined in the same way as outer parts of prior art constant velocity universal joints.

A variation of the above-mentioned second embodiment consists in that the outer ball running grooves are provided in the cover or bracket of the outer joint part. Machining takes place in the same way as with outer parts of prior art constant velocity universal joints for forming ball running grooves in said cover or bracket for which suitable clamping means have to be provided.

The end part and bracket are welded to one another during joint assembly.

There is proposed an alternative cage embodiment in that the windows each open towards an adjoining aperture or that all windows comprise a closed circumference.

The former embodiment allows larger apertures to be provided for the journals, whereas the second embodiment is more advantageous as regards the strength of the cage.

Furthermore, it should be mentioned with reference to the cage design that the cage may comprise a slot which connects the two apertures, whereas according to an alternative possibility, the cage may be closed entirely annularly. The latter embodiment clearly offers higher strength values for the cage. As far as the significance of the slot is concerned, it has to be pointed out that the cage on the one hand and the joint yoke with the journals and inner joint part on the other hand, in the assembled condition, constitute interlinked rings like two chain members. To permit mutual assembly, it is thus necessary, either to provide said slot in the cage or to provide one of said two parts in two pieces which, during assembly, are then connected to form a closed ring. For this purpose, it is possible, in particular, to use the joint yoke with the journal and the inner joint part which may be composed of two parts, and the journals may either form part of the arms of the joint yoke or parts of the inner joint part. In principle, however, the cage, too, may consist of two parts which are then assembled to a complete ring in that a slot is bridged by a web for example.

Therefore, it is proposed that in the case of a slotted cage, the inner joint part with the journals and the joint yoke is preferably produced in one piece or that, in the case of a completely annular cage, the inner joint part with the journals and the joint yoke are produced in two pieces and connected to one another in such a way that they cannot be separated.

Because of the relatively uncomplicated shape of the joint yoke it is preferable for a connecting journal to be formed on to the joint yoke, with the joint yoke constituting the connecting end for the wheel hub.

According to a further preferred embodiment, a connecting shaft is inserted into the outer joint part, in which case the outer joint part may constitute the connecting end for the axle differential.

According to a further adapted embodiment, it is proposed that a ring for fixing the one collar of a convoluted boot is placed on to the joint yoke and that the other collar of said convoluted boot is fixed to the outer joint part or to the connecting shaft connected to the outer joint part.

The invention may be applied to those joints wherein the balls are controlled by the depth of the tracks, i.e. Rzeppa (RF) joints or undercut-free (UF) joints. As far as those joints are concerned, it applies generally that outer and inner ball running grooves associated with one another comprise centre lines which are positioned in a common meridian plane and which, in a longitudinal section, extend symmetrically relative to one another with reference to a radial plane through the centres of the balls.

The invention can also be applied to those joints wherein the ball running grooves intersect in the longitudinal direction, as in the case of XL joints for which it applies generally that outer and inner ball running grooves associated with one another comprise centre lines which intersect in a plane extending through the centres of the balls and which extend symmetrically relative to meridian planes through said points of intersection.

BRIEF DESCRIPTION OF THE DRAWINGS

Below, the invention will be explained in greater detail with reference to different embodiments illustrated in the drawing wherein

FIG. 3 is an exploded view of the joint according to FIGS. 1 and 2, but the individual parts are not accurately axially aligned relative to one another.

FIG. 5 is an exploded view of the joint according to FIG. 4, but with the individual parts not being accurately axially aligned relative to one another.

FIG. 13 shows an outer joint part and cage in a dismantled condition similar to FIG. 3, with a modified cage embodiment.

DETAILED DESCRIPTION OF THE PREFERRED EMBODIMENT

Figure 1:
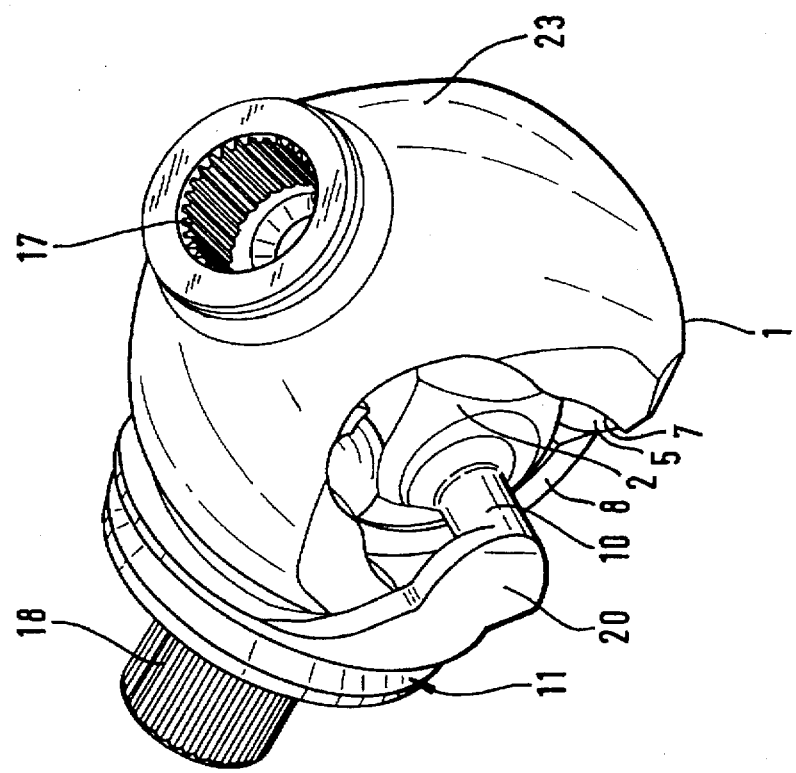
FIG. 1 is a perspective view of a first embodiment of a joint in accordance with the invention.

FIG. 1 illustrates a first embodiment of a joint in accordance with the invention. It shows an outer joint part 1 with a bore 17 in the end part 23 thereof, with a shaft having to be inserted into said bore 17. On one side there is illustrated one of two opposed slots 7. The outer joint part 1 accommodates an inner joint part 2 on one side of which there is visible one of two radially opposed journals 10 passing through the slot 7. Furthermore, it is possible to identify one of a plurality of torque transmitting balls 5 and a ball cage 8. The journal 10 is followed by one of the arms 20 of a joint yoke 11, with there being provided two radially opposed arms. The joint yoke 11 is produced to be integral with a connecting journal 18. It is indicated in the Figure that the journal 10 and the arm 20 are welded to one another. It can be seen that the journal 10 is integrally connected to the arm 20.

Figure 2:
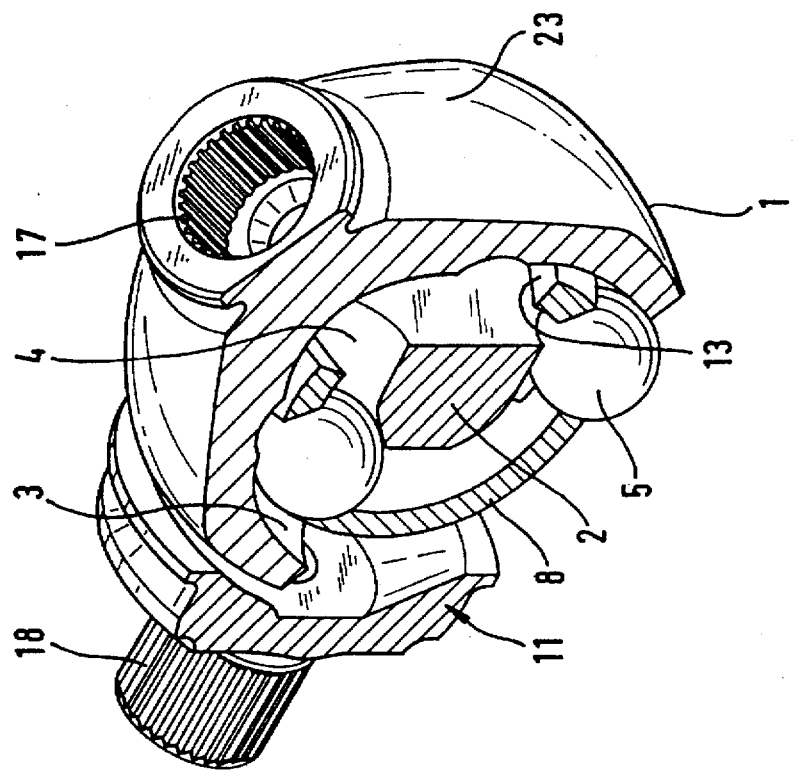
FIG. 2 is part of a section through the joint according to FIG. 1.

FIG. 2 shows part of the details of FIG. 1, carrying the same reference numbers. Furthermore, it is possible to see the inner ball running grooves 4 in the outer joint part 1 and the outer ball running grooves 3 in the inner joint part 2. As the partial section shows, the cage 8 is not fully annularly closed, but provided with a slot 13.

FIG. 3, from left to right, shows the outer joint part 1 with balls 5 arranged thereabove, the cage 8 and the inner joint part 2 with the joint yoke 11 which will all be described in greater detail below.

The outer joint part 1 comprises the end part 23, an opposed end aperture 21, side slots 7 and two outer ball running grooves 3 longitudinally extending between the slots.

The cage 8 has to be rotated by 90° around a vertical axis and by 90° clockwise around a central axis to enable it to reach its functionally accurate position relative to the outer joint part. The cage 8 is provided with the opposed apertures 16 and four windows 9 which each open towards the immediately adjoining aperture. Furthermore, outside the plane of the windows 9, there is provided a slot 13 connecting the two apertures 16 to one another.

The inner joint part 2 with the joint yoke 11 has to be pivoted anticlockwise by approximately 135° around the axis of the journals 10 and by approximately 45° clockwise around the axis of the journal 18 in order to reach a functionally accurate position relative to the outer joint part 1. The inner joint part is shown to have four inner ball running grooves 4 and the two radially opposed journals 10.

It can be seen that at the joint yoke 11, there are provided the connecting journal 18 and the two opposed arms 20 which are integrally connected to the journals 10 of the inner joint part 2. It can been seen that the cage 8 has to be slid over the inner joint part 2 and then turned into the functionally accurate position before the outer joint part and cage can be assembled with the inner joint part, said assembly operation taking place in the usual way by over-articulating the inner joint part and outer joint part for introducing the balls into the windows of the cage.

Figure 4:
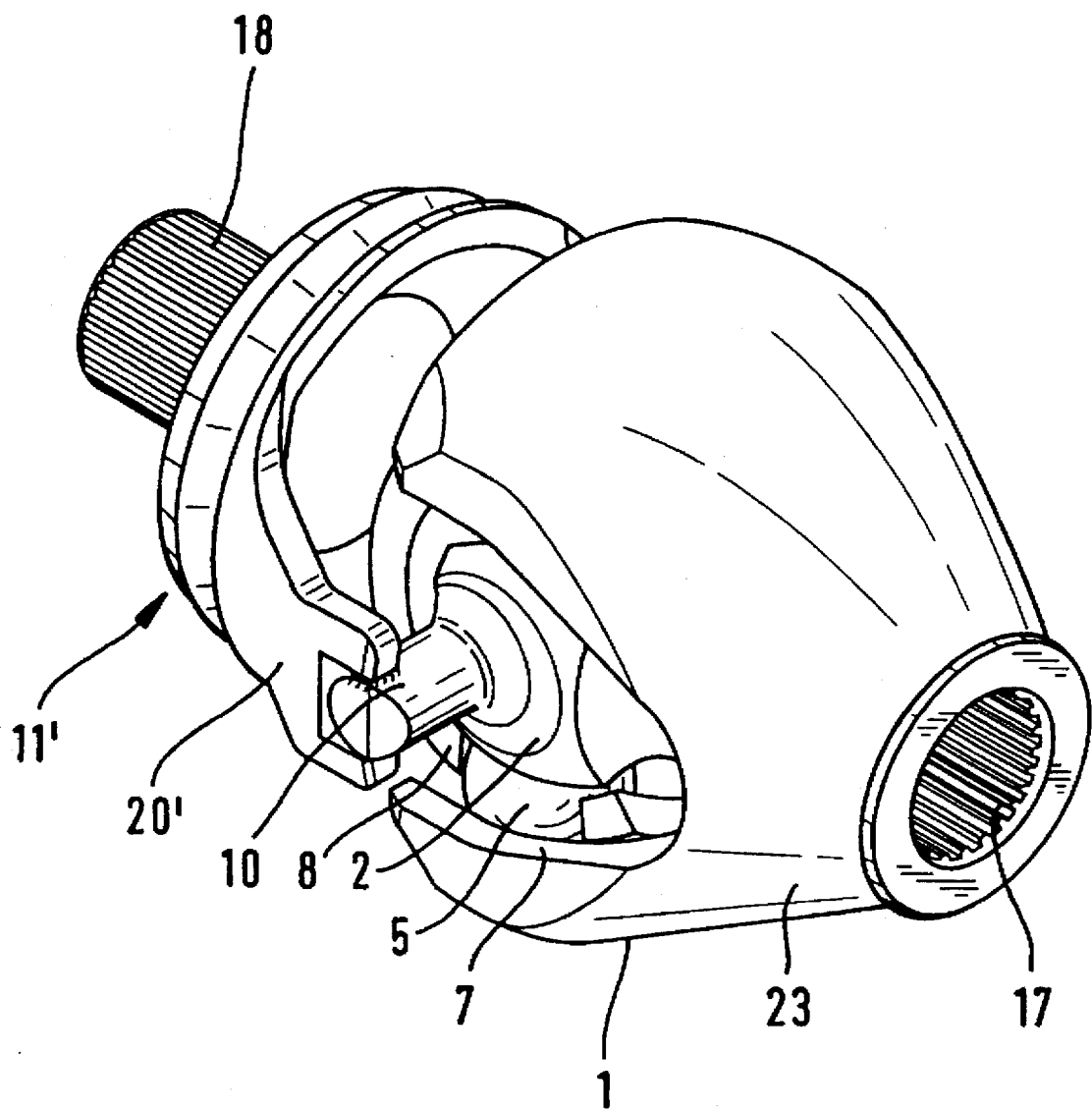
FIG. 4 is a perspective view of a second embodiment of a joint in accordance with the invention, in an unarticulated condition.

FIG. 4 shows a second embodiment of a joint in accordance with the invention. It shows the outer joint part 1 having a bore 17 in its end part 23, with a shaft having to be inserted into said bore 17. On one side there is illustrated one of two opposed slots 7. The outer joint part 1 accommodates an inner joint part 2 on one side of which there is visible one of two radially opposed journals 10 passing through the slot 7. Furthermore, it is possible to identify one of a plurality of torque transmitting balls 5 and a ball cage 8. The journal 10 is followed by one of the arms 20' of a joint yoke 11', with there being provided two radially opposed arms. The joint yoke 11' is produced to be integral with a connecting journal 18. It is indicated in the Figure that the journal 10 and the arm 20 are welded to one another.

FIG. 5, from left to right, shows the outer joint part 1 with balls 5 arranged thereabove, the cage 8 and the inner joint part 2 with the joint yoke 11', which will all be described in greater detail below.

The outer joint part 1 comprises the end part 23, an opposed end aperture 21, side slots 7 and two outer ball running grooves 3 longitudinally extending between the slots.

The cage 8 has to be rotated by 90° around a vertical axis and by 90° around a central axis to enable it to reach its functionally accurate position relative to the outer joint part 1. The cage 8 is provided with opposed apertures 16 and four windows 9 which are each open toward the immediately adjoining aperture. The cage 8 is annularly closed.

The inner joint part 2, too, like the cage 8, has to be rotated by 90° around a vertical axis and, additionally, by 90° anti-clockwise around a longitudinal axis to reach a functionally accurate position relative to the outer joint part 1. At the inner joint part 2, there are identifiable four inner ball running grooves 4 and the two radially opposed journals 10.

The joint yoke 11', just like the cage and the inner joint part, has to be rotated by 90° around a vertical axis and by 180° around an axis corresponding to the longitudinal axis of the inner joint part to reach a functionally accurate position relative to the outer joint part 1. At the joint yoke 11', there are identifiable the connecting journal 18 and the two opposed arms 20' which, at their ends, comprise open half-cups 26 into which it is necessary to insert the journals 10 of the inner joint part 2 for being welded thereto.

It is easily appreciated that first the cage 8 has to be threaded on to the inner joint part 2 before the inner joint part and joint yoke are welded to one another. The remaining part of the joint assembly takes place in that, in a way known in itself, the inner joint part and outer joint part are over-articulated for introducing the balls into the windows of the cage.

FIGS. 6 to 9 will be described jointly hereafter. To make it easier to understand the Figures, it is pointed out that an offset sectional line according to FIG. 7 was chosen to illustrate the ball tracks in FIGS. 6 and 8. Also, to illustrate both a plan view of and a section through the cage in FIG. 7, an offset sectional line according to FIG. 6 was chosen. As far as details are concerned, there are shown an approximately yoke-shaped outer joint part 1 with an end part 23 and a bore 17 and—in dashed lines—an inserted connecting shaft 15. A cavity 6 extending as far as an end aperture 21 comprises outer ball running grooves 3 provided in the form of axially undercut-free grooves. The cavity 6 accommodates the inner joint part 2 with inner ball running grooves 4 which are also undercut-free. The balls 5 are received in the ball running grooves 3, 4. The inner joint part 2 with the journals 10 is followed by the arms 20 of the joint yoke 11, with the connecting journal 18 being formed on to said arms 20. The longitudinal section shows how the slotted cage 8 passes through the closed ring consisting of the joint yoke 11 and the inner joint part 2. The cage 8 is guided with direct contact between the inner joint part 2 and the outer joint part 1.

An annular part 12 for fixing a convoluted boot 14 is slid on to the joint yoke 11; the larger collar 24 of the convoluted boot 14 is arranged on said annular part 12, whereas its smaller collar 25 is fixed on the connecting shaft 15.

Figure 8:
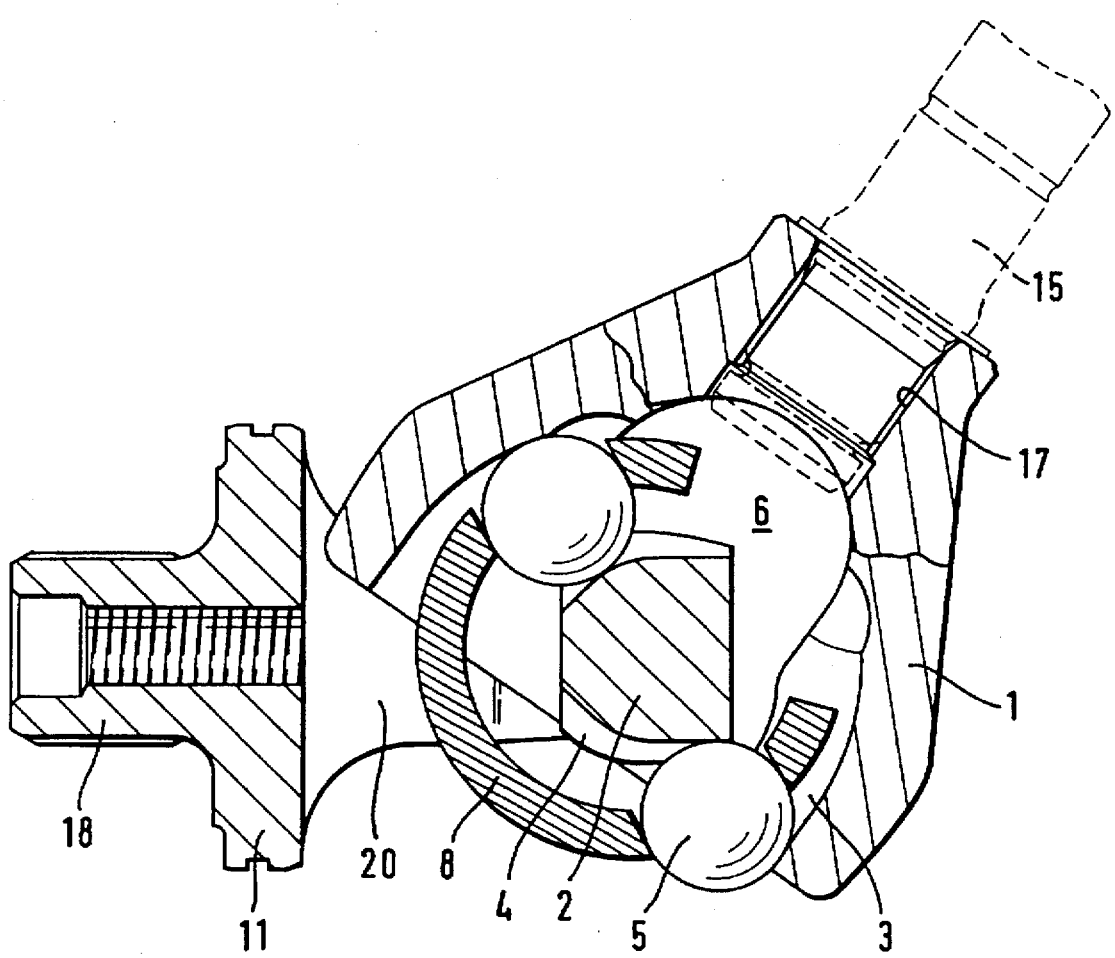
FIG. 8 is a longitudinal section through the joint according to FIGS. 6 and 7 in an articulated condition, said section extending between the yoke arms.

FIG. 8 shows an articulation angle of approximately 55° at which the balls 5 are still accurately guided in the ball running grooves 3, 4.

Figure 9:
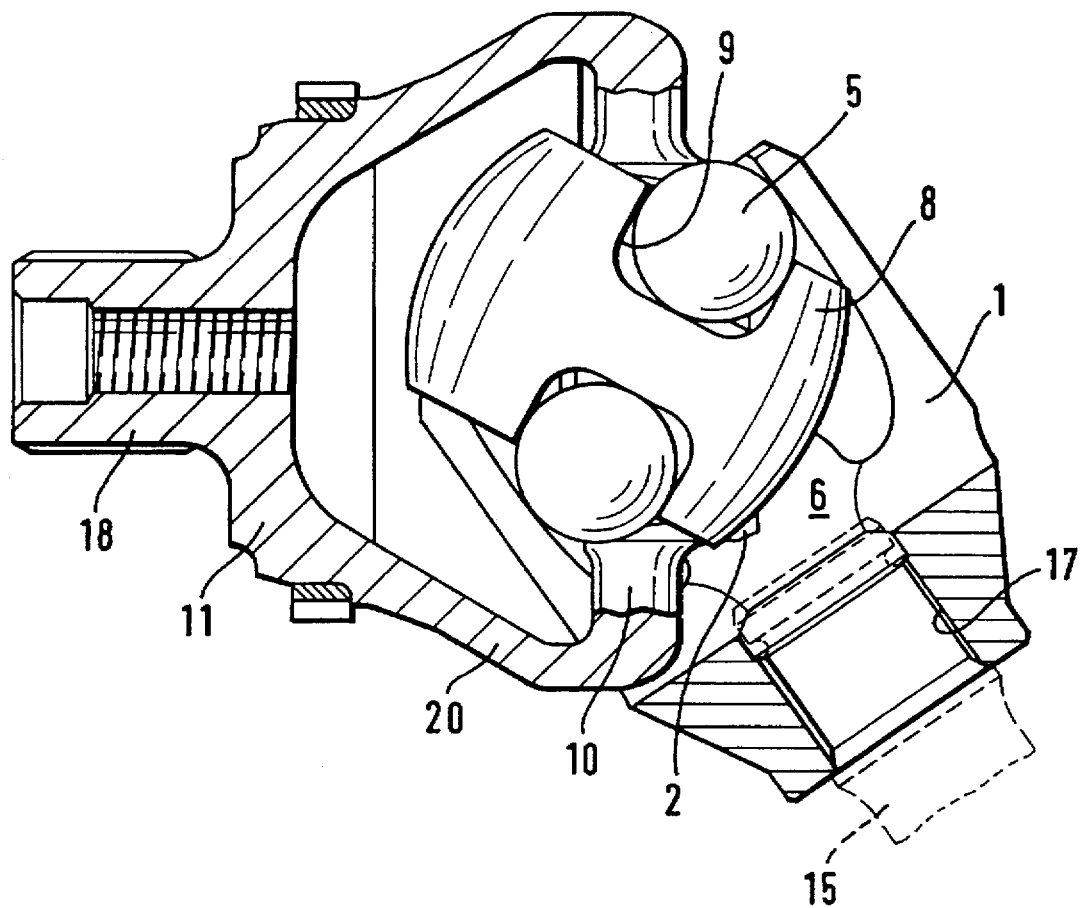
FIG. 9 shows a joint according to FIGS. 6 and 7 in an articulated condition with partial views in a longitudinal section through the yoke arms.

FIG. 9 shows that even if the joint is articulated by 55°, the balls 5 are still adequately guided in the laterally open windows 9 of the cage 8, and held in one plane.

Below, FIGS. 10 and 11 will be described jointly. To make it easier to understand the Figures it is pointed out that an offset sectional line analogously to FIG. 7 was selected to illustrate the ball tracks in FIG. 10. As far as details are concerned, there are shown an approximately yoke-shaped outer joint part 1 with an end part 23 and a bore 17. A cavity 6 extending as far as the end aperture 21 comprises outer ball running grooves 3. The cavity 6 accommodates an inner joint part 2 with inner ball running grooves 4. The centres of curvature of the outer and inner ball running grooves 3, 4 are offset relative to one another on the joint axis, as indicated by radii at the respective track bases. The ball running grooves 3, 4 receive balls 5. The inner joint part 2 is followed (via the journals and arms 20 which cannot be seen) by a joint yoke 11 comprising a formed-on connecting journal 18. The cage 8 is guided with direct contact between the inner joint part 2 and the outer joint part 1. An annular part 12 for fixing a convoluted boot is slid on to the joint yoke 11.

Figure 10:
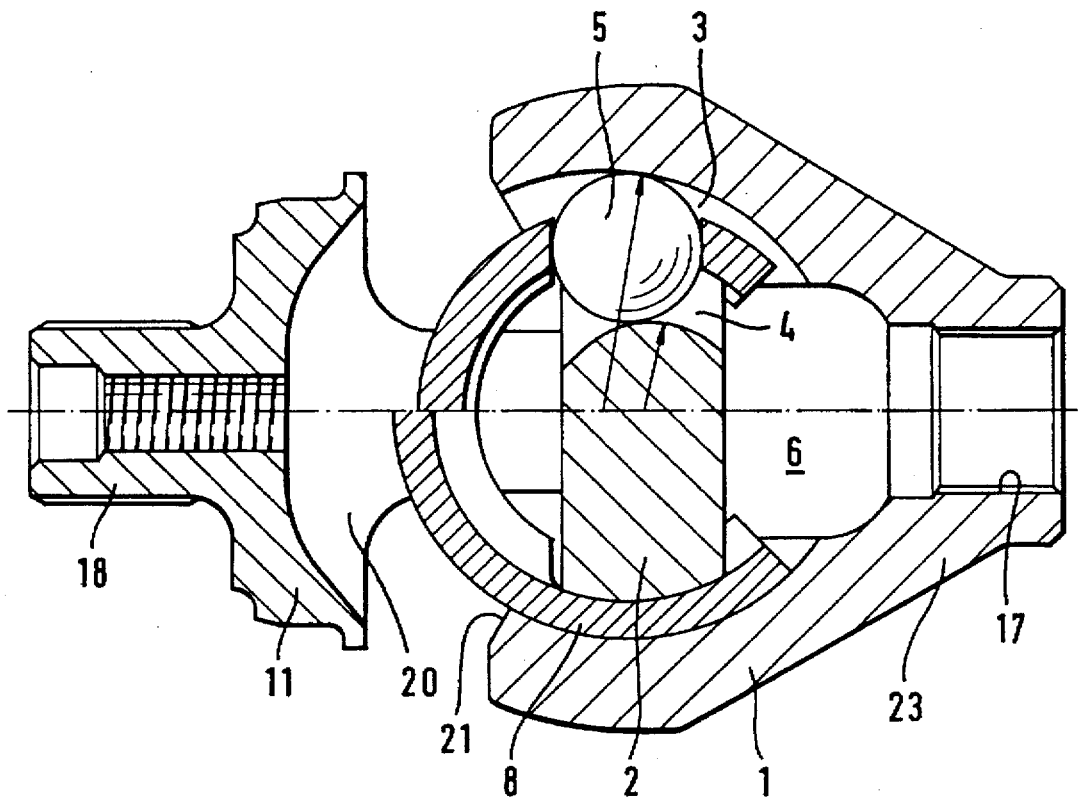
FIG. 10 shows a joint in an embodiment similar to that shown in FIG. 6, with a modified track shape (Rzeppa joint).
Figure 11:
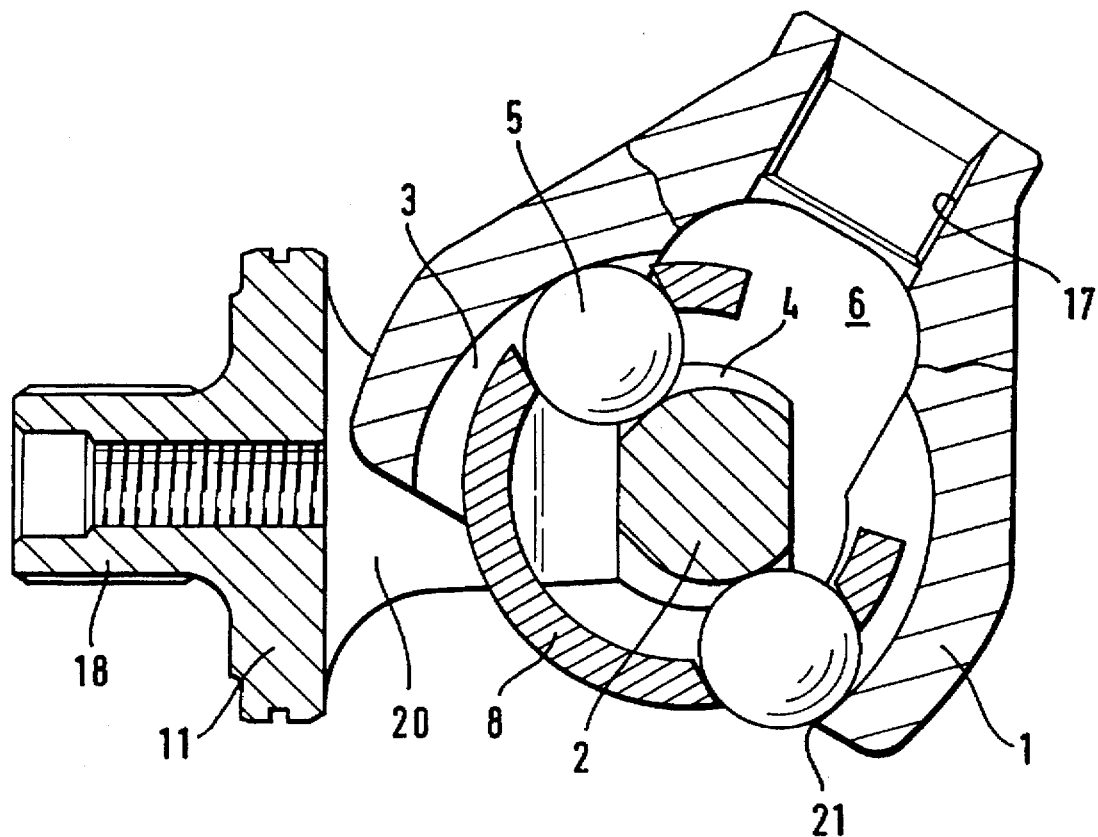
FIG. 11 shows a joint according to FIG. 10 in an articulated condition in a longitudinal section through the region between the yoke arms.

FIG. 11 shows the joint of FIG. 10 articulated at a 60° angle.

Figure 7:
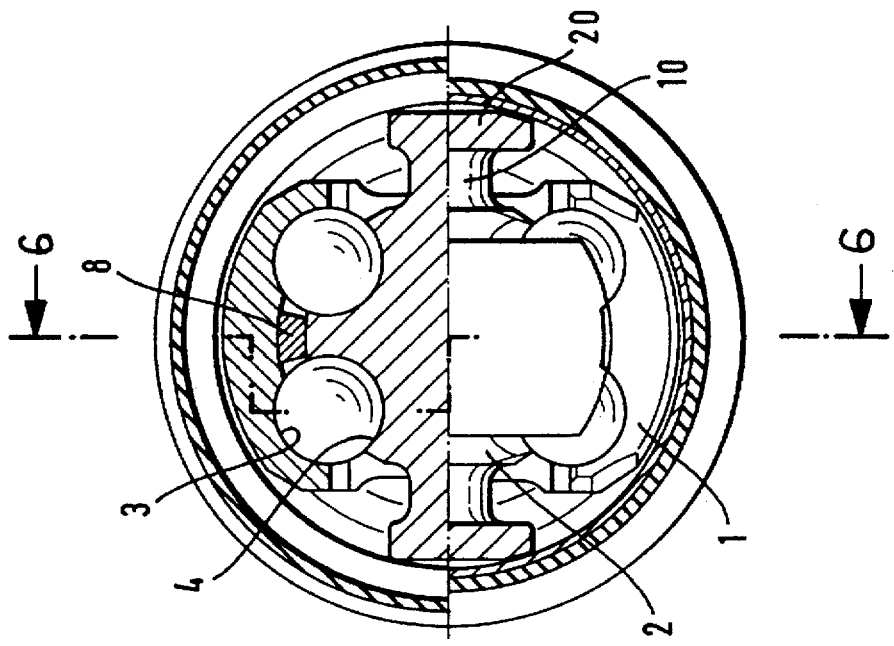
FIG. 7 is a cross-section through the joint according to FIG. 6, along the offset sectional line of FIG. 6.
Figure 6:
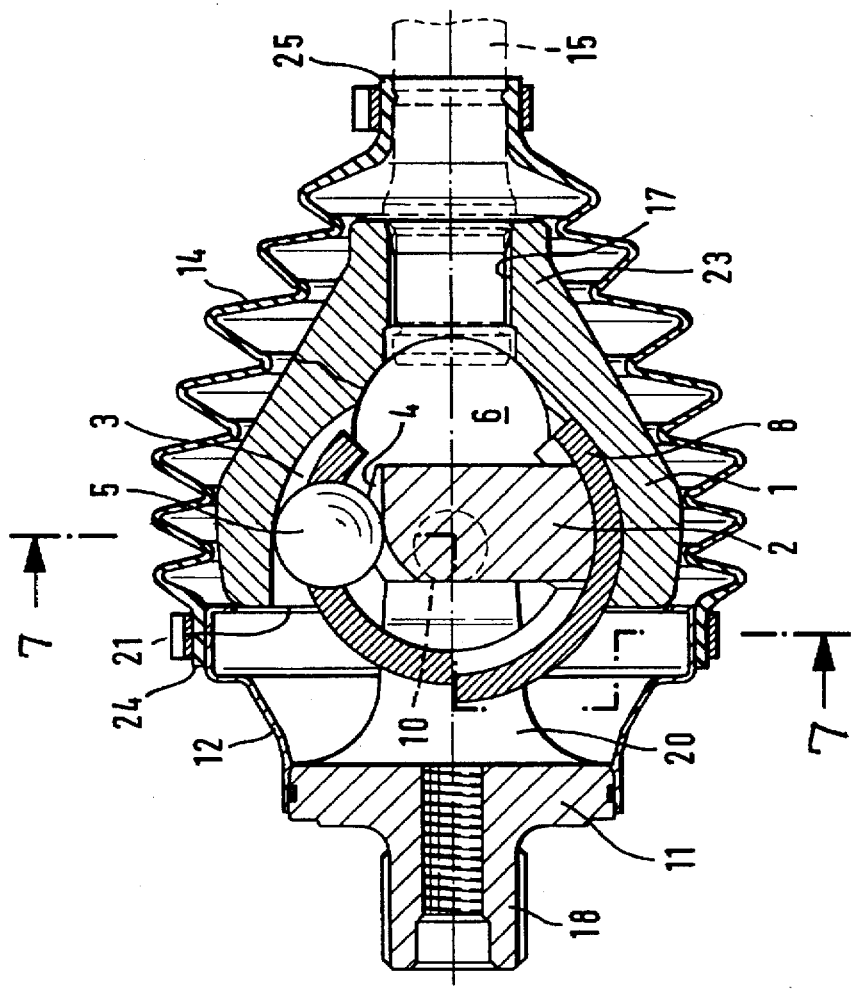
FIG. 6 is a longitudinal section through a joint according to FIGS. 1 to 3, along the offset sectional line of FIG. 7, showing a first track shape (UF joint).
Figure 12:
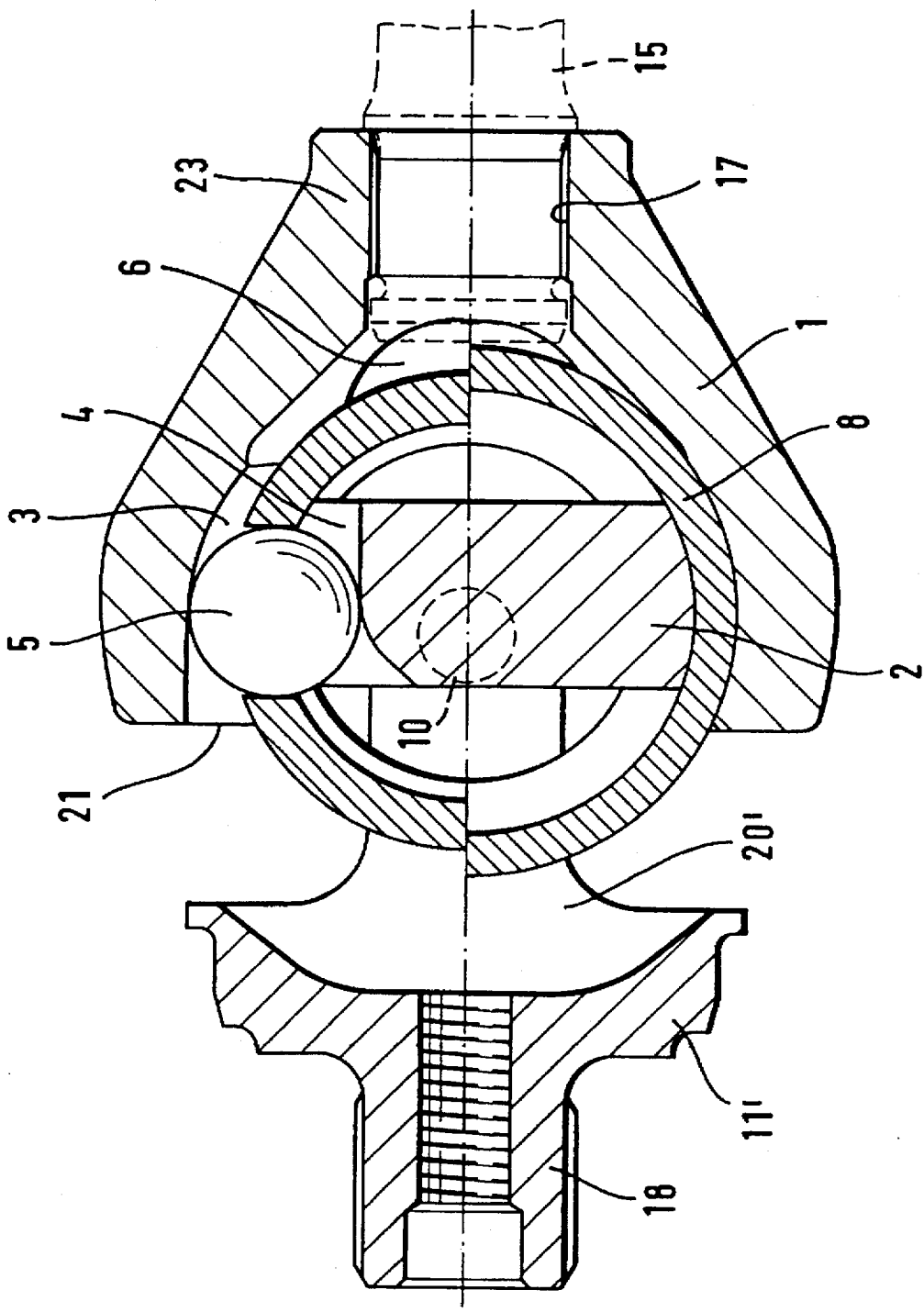
FIG. 12 shows a joint of the type illustrated in FIGS. 4 and 5 in a longitudinal section analogously to the offset sectional line of FIG. 7.

To make it easier to understand FIG. 12, it is pointed out that an offset sectional line analogously to FIG. 7 is used to illustrate the ball tracks. As far as details are concerned, there are illustrated an approximately yoke-shaped outer joint part 1 with an end part 23 and a bore 17 and—in dashed lines—an inserted connecting shaft 15. A cavity 6 extending as far as an end aperture 21 comprises outer ball running grooves 3 provided in the form of axially undercut-free grooves. The cavity 6 accommodates an inner joint part 2 with inner ball running grooves 4 which are also undercut-free. The ball grooves 3, 4 receive balls 5. The inner joint part 2 is followed by journals 10 and arms 20 (shown in dashed lines) of a joint yoke 11 with a formed-on connecting journal 18. The longitudinal section shows that the ring assembled from the joint yoke 11 and the inner joint part 2 with journals 10 passes through an annular cage 8. The cage 8 is guided with direct contact between the inner joint part 2 and the outer joint part 1. An annular part 12 for fixing a convoluted boot is slid on to the joint yoke 11.

FIG. 13 shows an outer joint part 1 on the left and a cage 8 on the right in functionally accurate positions relative to one another. At the outer joint part 1, there are identifiable an end part 23, an opening 17 provided therein and two side slots 7 as well as the outer ball running grooves 3 and part of an intermediate cage guiding face.

The cage 8 differs from the previously described cage embodiments in that the cage windows 9 are circumferentially closed. The cage also shows a slot 13 connecting the side apertures 16 of same. The edges of the slot 13 constitute a centring collar 28 opposite which there is provided a centring bore 29 enabling the cage 8 to be clamped on for maching purposes.

Figure 15:
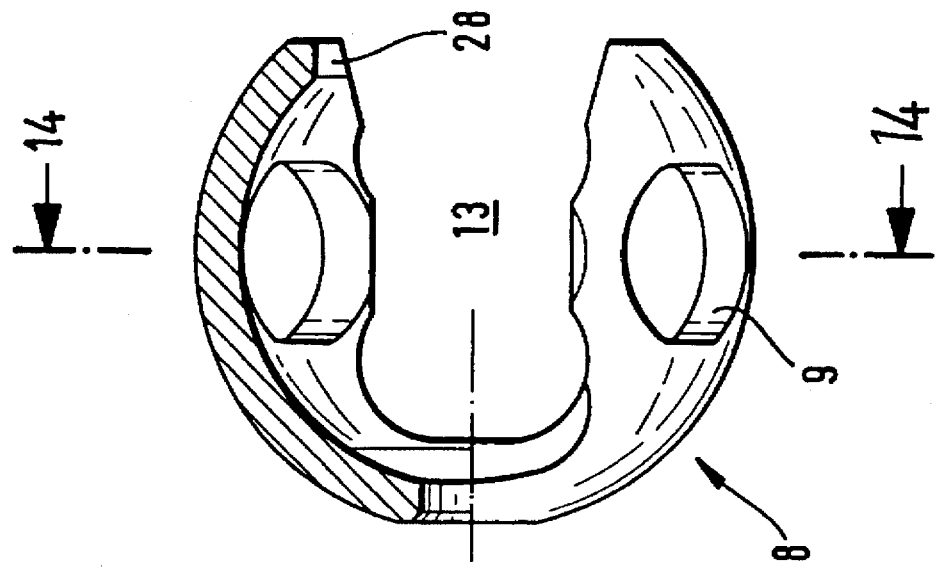
FIG. 15 is a longitudinal section through the cage according to FIG. 13.
Figure 14:
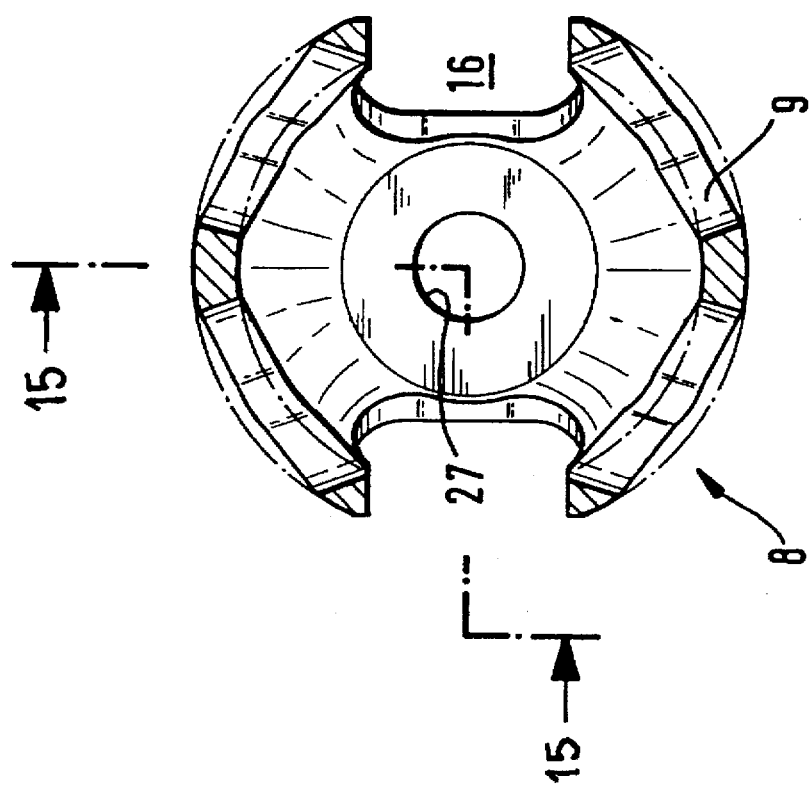
FIG. 14 is a cross-section through the cage according to FIG. 13.

Below, FIGS. 14 and 15 will be described jointly. At the cage 8, there are identifiable the above-mentioned details, i.e. circumferentially closed cage windows 9, apertures 16, the slot 13, centring collar 28 and centring bore 29.

Figure 16:
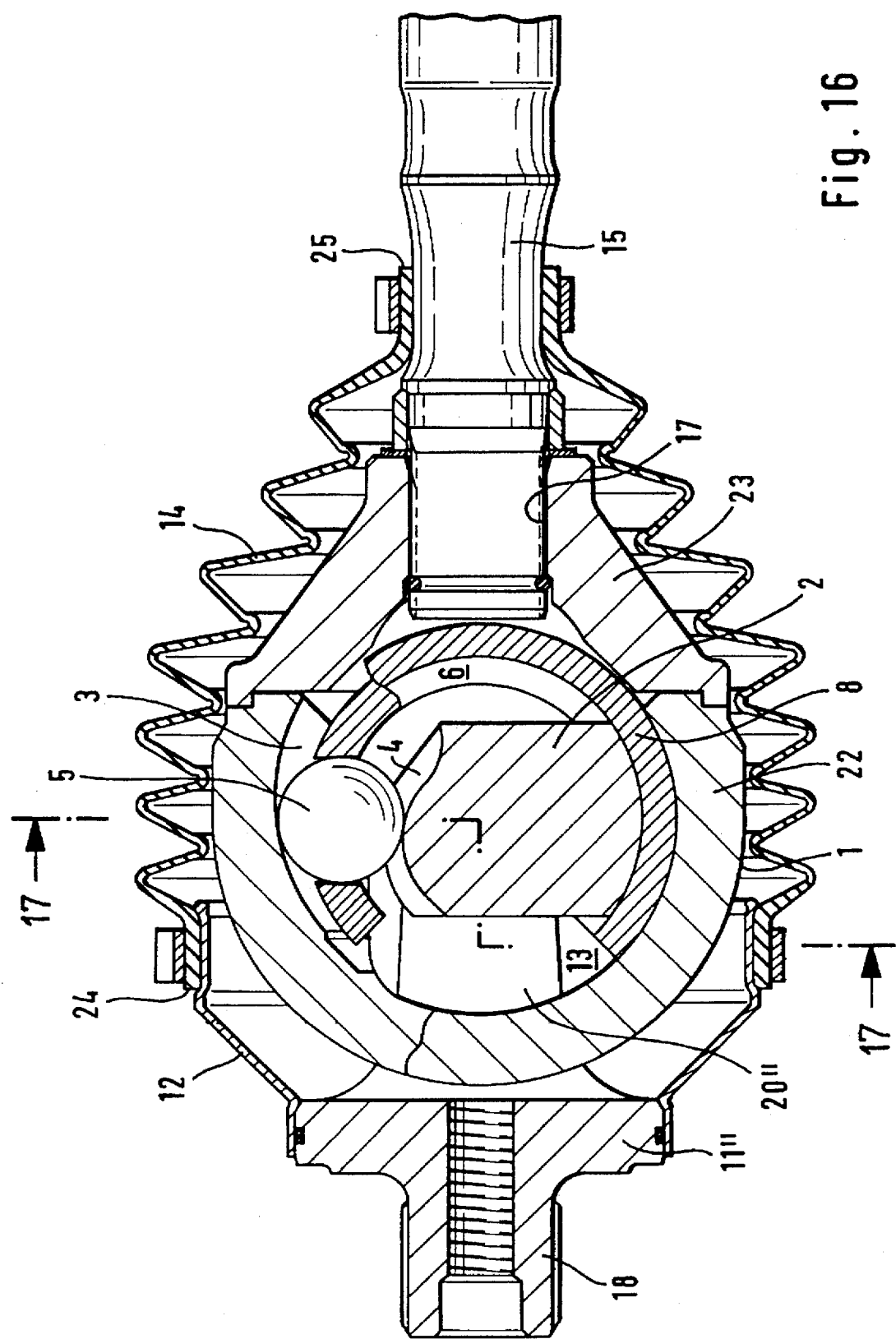
FIG. 16 shows a joint in accordance with the invention in the form of a third embodiment in an unarticulated condition in a longitudinal section according to the offset sectional line of FIG. 17 in the centre between the yoke arms.
Figure 17:
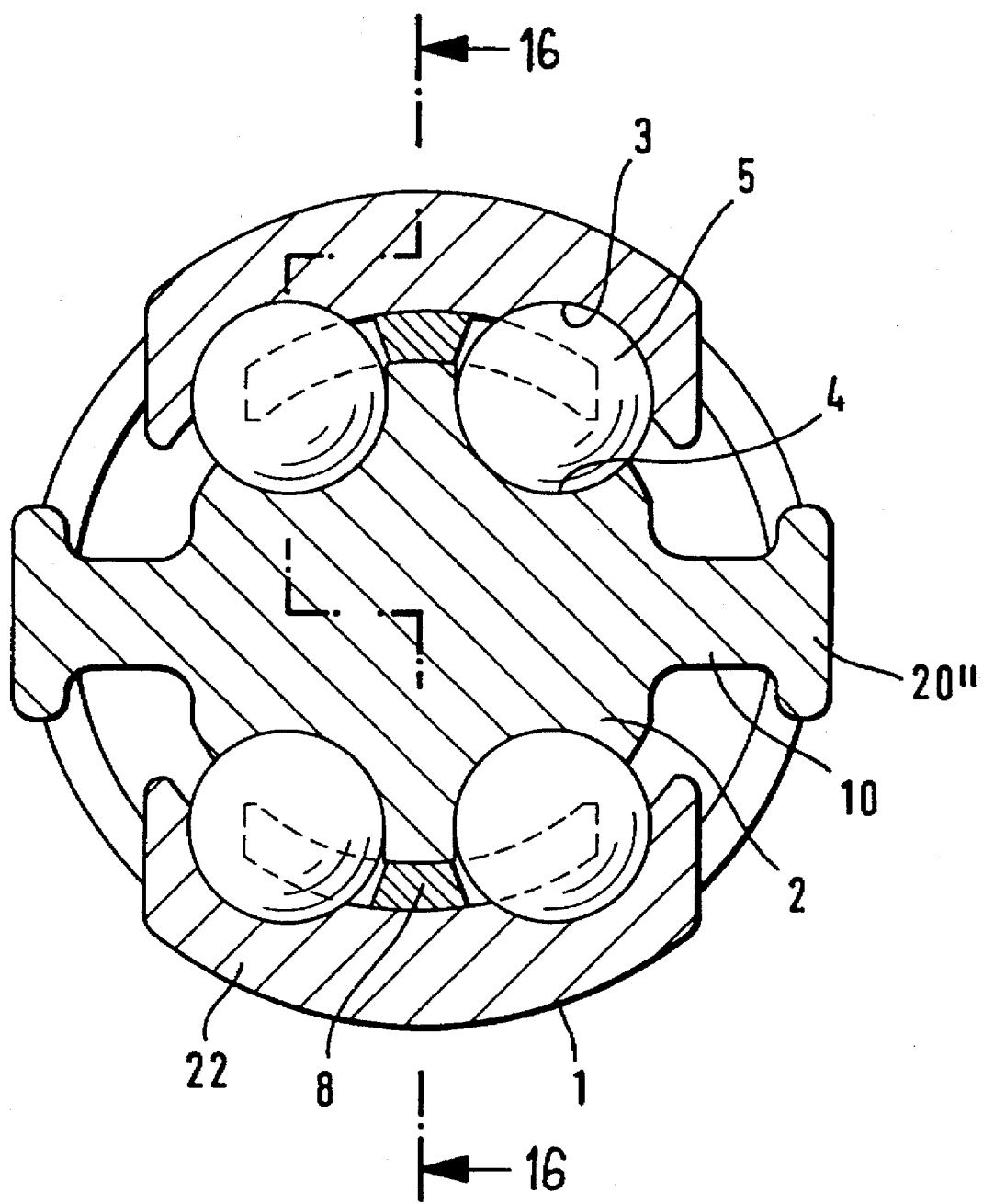
FIG. 17 shows the joint according to FIG. 16 in a cross-section through the joint centre.

Below, FIGS. 16 and 17 will be described jointly. They show a modified embodiment of the joint in accordance with the invention. In the plane shown in the longitudinal section and extending perpendicularly relative to opposed slots of the outer joint part, an end part 23 of the outer joint part 1 is closed at its end by a cover or bracket part 22 which, in turn, extends between the arms 20" of a joint yoke 11". The division between the end part 23 and the bracket 22 is such that outer ball running grooves 3 of the outer joint part 1 are provided in said bracket part 20. There is provided a cage 8 with a slot 13, which permits the inner joint part 2 and the joint yoke 11" to be designed in one piece.

For illustrating the ball tracks, an offset sectional line similar to that of FIG. 7 was selected in the longitudinal section in the broken-out part at the top. The end part 23 comprises a bore 17 with an inserted connecting shaft 15. A cavity 6 comprises outer ball running grooves 3. The cavity 6 accommodates an inner joint part 2 with inner ball running grooves 4. The ball running grooves 3, 4 receive balls 5. The inner joint part 2 is followed by journals 10 and the arms 20" of a joint yoke 11" with a formed-on journal 18. The cage 8 is guided with direct contact between the inner and outer joint parts.

An annular part 12 for fixing a convoluted boot 14 is slid on to the joint yoke 11; the larger collar 24 of the convoluted boot 14 is arranged on said annular part 12, whereas its smaller collar 25 is fixed to the connecting shaft 15.

Figure 18:
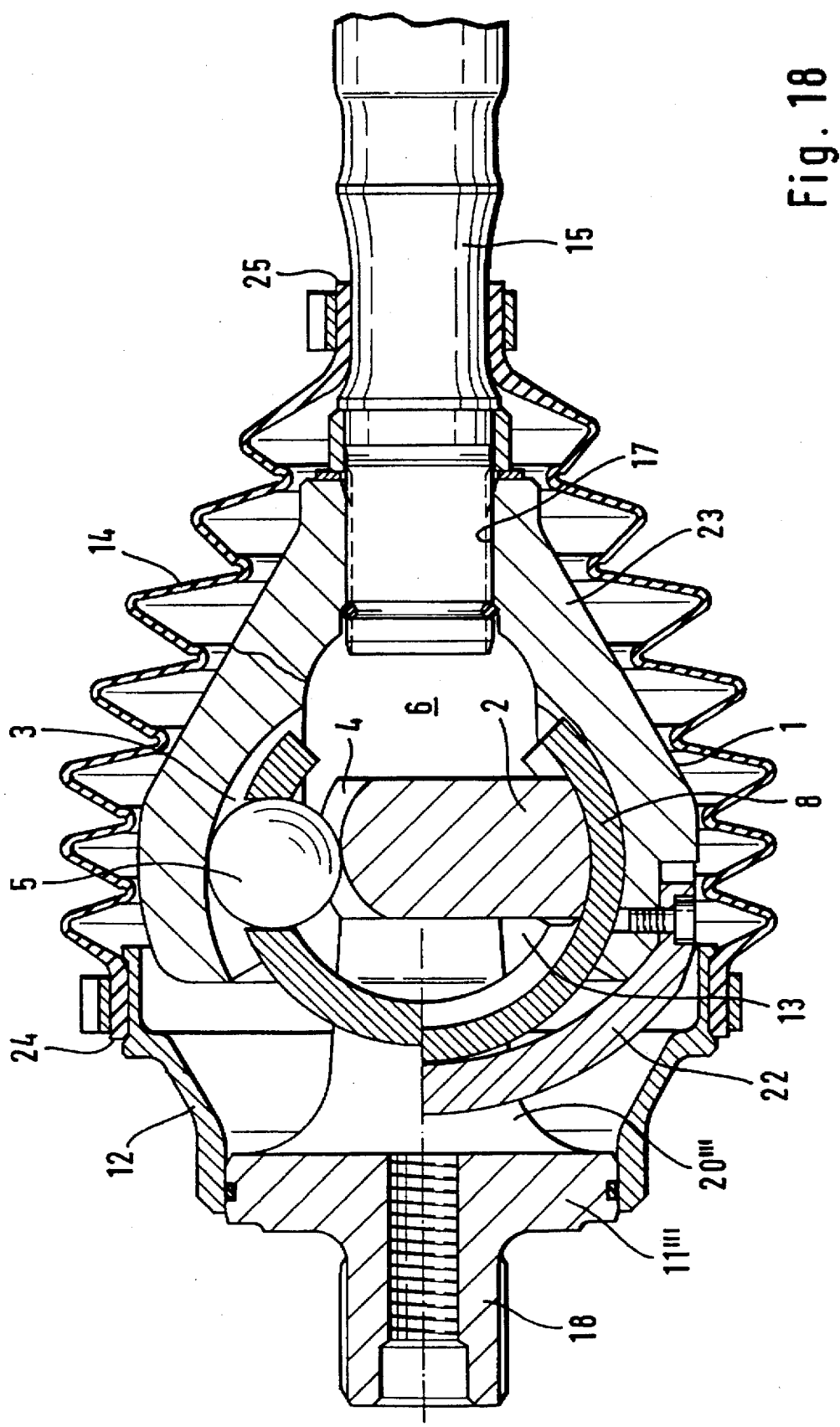
FIG. 18 shows a joint in accordance with the invention in the form of a fourth embodiment in an unarticulated condition in a longitudinal section similar to the offset sectional line of FIG. 7 in the centre between the yoke arms.
Figure 19:
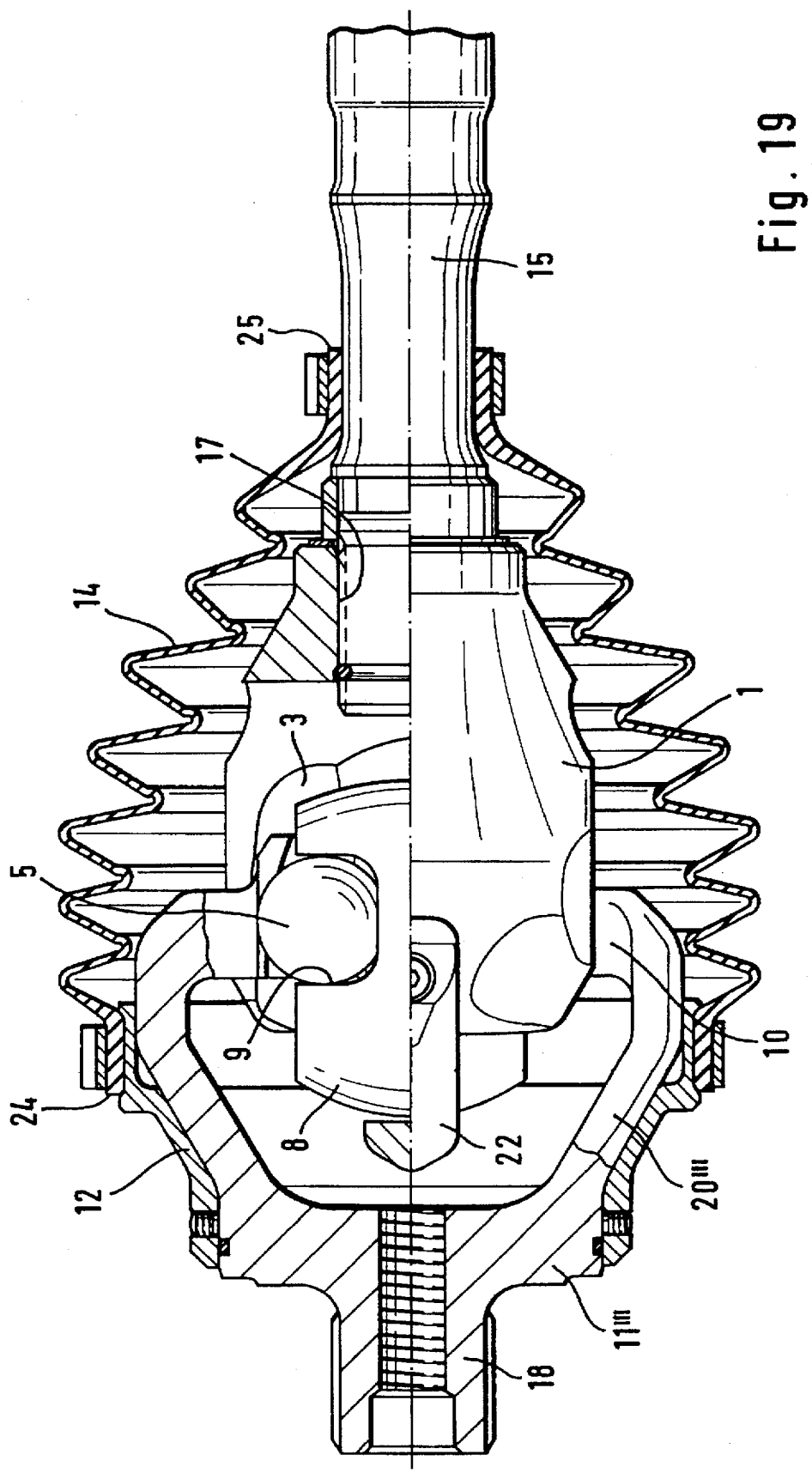
FIG. 19 shows the joint according to FIG. 18 in an unarticulated condition in a longitudinal section through the yoke arms.

Below, FIGS. 18 and 19 will be described jointly. They show a further embodiment of a joint in accordance with the invention. In a plane extending perpendicularly relative to opposed slots of the outer joint part, an end part 23 of a yoke-shaped outer joint part 1 is closed at its end by a narrow bracket part 22 which, in turn, extend between the arms 20'" of the joint yoke 11'". The bracket 22 is bolted to the outer joint part 1. The division between the end part 23 and the bracket 22 is such that the outer ball running grooves 3 of the outer joint part are provided in the former end part 23. There is provided a cage 8 with a slot 13, which permits the inner joint part 2 and the joint yoke 11'" to be designed in one piece.

In the end part 23, there is shown a bore 17 with an inserted connecting shaft 15. A cavity 6 is provided with the outer ball running grooves 3. The cavity 6 accommodates an inner joint part 2 with inner ball running grooves 4. The ball running grooves 3, 4 receive balls 5. The inner joint part 2 is followed by the journals 10 and the arms 20'" of a joint yoke 11'" provided with a formed-on connecting journal 18. A cage 8 with ball receiving slots 9 is guided with direct contact between the inner and outer joint parts. An annular part 12 is slid on to the joint yoke 11 for fixing a convoluted boot 14; the larger collar 24 of the convoluted boot 14 is arranged on said annular part 12, whereas its smaller collar 25 is fixed on the connecting shaft 15.

While the above detailed description describes the preferred embodiment of the present invention, the invention is susceptible to modification, variation, and alteration without deviating from the scope and fair meaning of the subjoined claims.

What is claimed is:

1. A constant velocity universal joint for large articulation angles, consisting of an outer joint part comprising a cavity and longitudinally extending outer ball running grooves opening towards the cavity, an inner joint part positioned inside the cavity and comprising longitudinally extending inner ball running grooves corresponding to the outer ball running grooves, torque transmitting balls running in the associated outer and inner ball running grooves, and a cage which is arranged between the outer joint part and the inner joint part, which is provided with windows for accommodating the balls and which comprises two opposed apertures haivng generating central axes which extend transversely to the joint axis, the outer joint part is provided with radially opposed slots with surface-normal central axes which coincide with the central axes of the apertures, the inner joint part includes two radially opposed journals which extend transversely to the joint axis and comprise central axes which coincide with the central axes of the slots and pass through the slots, the cage is substantially annular in shape relative to the central axes of the apertures and a two-arm joint yoke with said arms secured to the journals.

2. A joint according to claim 1, wherein the outer joint part comprises a central end aperture and that the slots are open towards the central end aperture.

3. A joint according to claim 2, wherein the outer joint part comprises a closed end part and that the slots extend from the end aperture to the closed end part.

4. A joint according to claim 3, wherein the outer ball running grooves are provided in a one-piece outer joint part.

5. A joint according to claim 1, wherein the outer joint part comprises a central end cover and that the slots are delimited at both ends in the outer joint part.

6. A joint according to claim 5, wherein the outer ball running grooves are provided in the cover of the outer joint part.

7. A joint according to claim 1, wherein the windows in the cage each open towards an aperture.

8. A joint according to claim 1, wherein all the windows in the cage comprise a closed circumference.

9. A joint according to claim 1, wherein the cage comprises a slot which connects the two end apertures.

10. A joint according to claim 9, wherein with a slotted cage, the inner joint part is produced as to be integral with the journals and the joint yoke.

11. A joint according to claim 1, wherein the joint comprises four balls and a corresponding number of inner and outer ball running grooves and windows in the cage.

12. A joint according to claim 1, wherein the cage is closed circumferentially.

13. A joint according to claim 12, wherein with an entirely angular cage, the inner joint part with the journals and the joint yoke are produced in two pieces and connected to one another in such a way that they cannot be separated.

14. A joint according to claim 13, wherein the inner joint part with the journals and the joint yoke are welded to one another.

15. A joint according to claim 1, wherein a connecting journal is formed on to the joint yoke.

16. A joint according to claim 1, wherein a connecting shaft is inserted into the outer joint part.

17. A joint according to claim 1, wherein a ring for fixing one collar of a convoluted boot is placed on to the joint yoke, and that the other collar of said convoluted boot is fixed to the connecting shaft connected to the outer joint part.

18. A joint according to claim 1, wherein outer and inner ball running grooves associated with one another comprise centre lines which are positioned in a common meridian plane and which, in a longitudinal section, extend symmetrically relative to one another with reference to a radial plane through the centres of the balls.

19. A joint according to claim 1, wherein outer and inner ball running grooves associated with one another comprise centre lines which intersect in a plane extending through the centres of the balls and which extend symmetrically relative to meridian planes through said points of intersection.

* * * * *

UNITED STATES PATENT AND TRADEMARK OFFICE
CERTIFICATE OF CORRECTION

PATENT NO. : 5,716,278
DATED : February 10, 1998
INVENTOR(S) : Werner Krude

It is certified that error appears in the above-identified patent and that said Letters Patent is hereby corrected as shown below:

Title page, Item [56]: please add the following patent which was not included on the printed patent:

1-288624      11/1989      Japan

Column 1, line 38, "is" should be --its--

Column 1, line 50, after "that" insert --at--

Column 7, line 13, "maching" should be --machining--

Column 8, line 21, Claim 1, "haivng" should be --having--

Signed and Sealed this

Eighth Day of September, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   :   5,716,278
DATED        :   February 10, 1998
INVENTOR(S)  :   Werner Krude It is certified that error appears in the above-identified patent and that said Letters Patent is hereby corrected as shown below:

Column 8, line 60, Claim 13, "angular" should be --annular--

Signed and Sealed this

Twentieth Day of October, 1998

*Attest:*

BRUCE LEHMAN

*Attesting Officer*                *Commissioner of Patents and Trademarks*